(No Model.)
T. J. FRANCIS.
WAGON BRAKE.
No. 246,743. Patented Sept. 6, 1881.
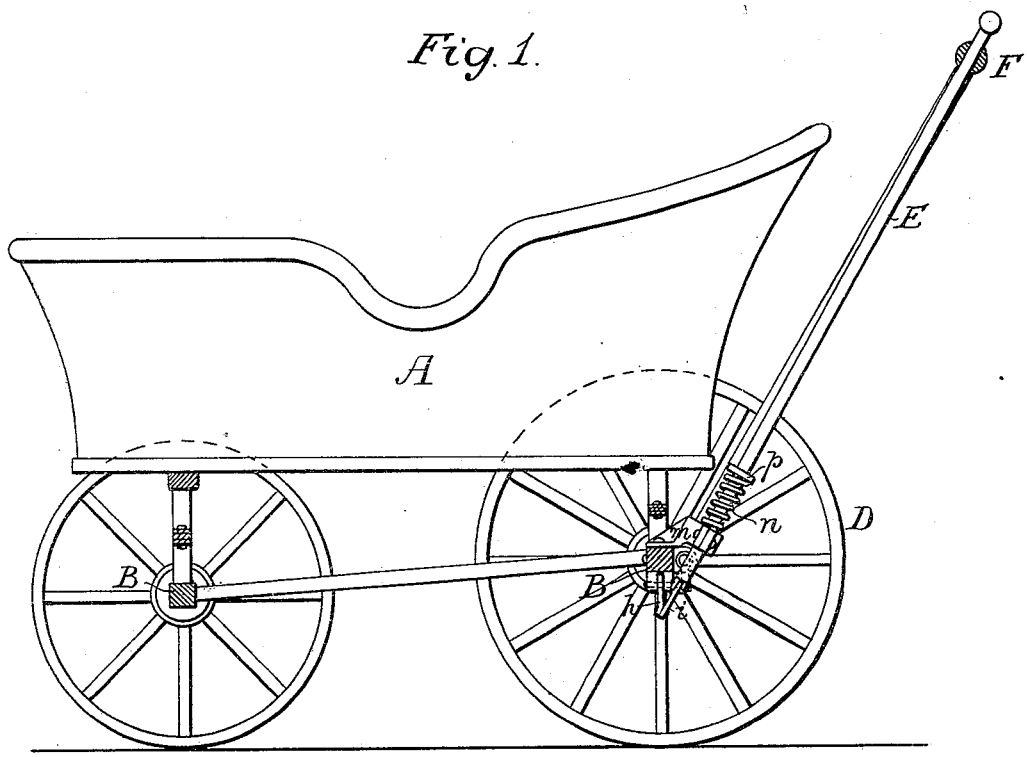
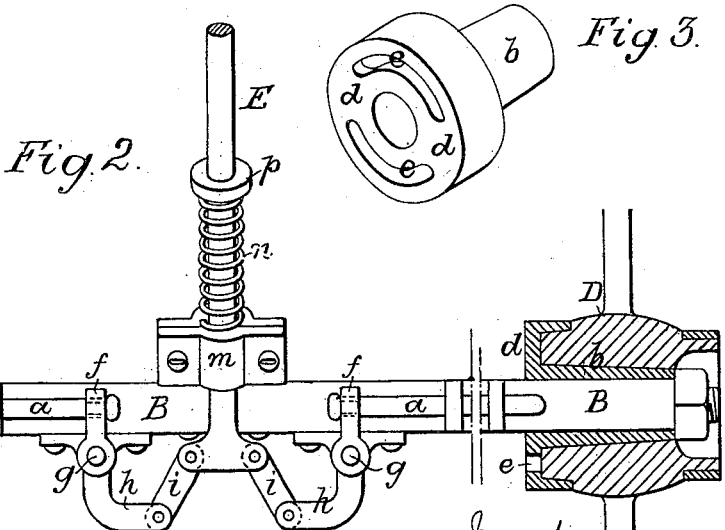
Witnesses
H. L. Fulenwider.
Harry Smith
Inventor
Thomas J. Francis
by his Attorneys
Howson & Son
N. PETERS, Photo-Lithographer, Washington, D. C.

UNITED STATES PATENT OFFICE.

THOMAS J. FRANCIS, OF CAMDEN, NEW JERSEY.

WAGON-BRAKE.

SPECIFICATION forming part of Letters Patent No. 246,743, dated September 6, 1881.

Application filed July 29, 1881. (No model.)

*To all whom it may concern:*

Be it known that I, THOMAS J. FRANCIS, a citizen of the United States, residing in Camden, New Jersey, have invented certain Improvements in Brakes for Carriages and Wagons, of which the following is a specification.

My invention relates to certain improvements in that class of carriage or wagon brakes in which a brake-bolt is thrust into an opening in the hub of the wheel, so as to lock the wheel to the axle, the objects of my invention being to construct an effective brake of this class, and to so adapt it to a child's carriage that the wheels will be locked to the axle as soon as the handle of the carriage is released.

In the accompanying drawings, Figure 1 is a side view, partly in section, of sufficient of a child's carriage to illustrate my invention; Fig. 2, a rear view of the brake and brake-actuating devices, and Fig. 3 a detached perspective view of one of the hub-boxes with its brake-plate.

A is the body of the carriage, which is supported upon springs resting on the axles B B, as usual. The rear axle, B, has guides for a pair of bolts, $a$, and the boxes $b$ of the hubs of the rear wheels, D, have at the inner ends annular plates $d$, in which are formed segmental slots $e$, Fig. 3. When the bolts $a$ are retracted the wheels D are free to turn on the axle as usual; but when the bolts $a$ are thrust outward the end of one bolt enters the slot $e$ in the plate $d$ of one wheel, and the end of the opposite bolt enters the slot in the plate of the opposite wheel, and both wheels are thereby locked to the axle.

A device of this sort has heretofore been proposed in which the locking-bolts entered circular openings in the hub of the wheel; but my invention differs from this in two respects—namely, in the employment of segmental slots instead of circular openings, and in the formation of these slots in plates on the boxes of the hubs instead of in the hubs themselves. Not only is the device of a more permanent character than that above alluded to, but the slots insure the entrance of the ends of the locking-bolts, whereas simple circular openings are likely to be carried past the ends of the bolts without permitting the entrance of the latter, especially in the event of a rapid rotation of the wheels.

The devices for operating the locking-bolts $a$ also form part of my invention and will now be described.

The inner ends of the bolts $a$ are connected to arms $f$, carried by rock-shafts $g$, which are adapted to bearings on the under side of the axle, and are furnished with bent arms $h$, connected by links $i$ to the forked lower end of a rod, E, the latter being adapted to slide in an inclined bearing, $m$, secured to the top of the axle. A coiled spring, $n$, is interposed between said bearing and a collar, $p$, on the rod, the tendency of this spring being to elevate the rod and thereby cause the outer ends of the locking-bolts $a$ to be thrust into the slots $e$ of the plates $d$, so as to lock the wheels D to the axle B, the bolts being withdrawn upon depressing the rod E. The upper end of the rod E projects through the handle F, whereby the carriage is propelled, and said upper end of the rod is furnished with a T-head parallel with said handle, so that as soon as the latter is grasped by the hand in order to propel the carriage the rod E will be depressed and the bolts $a$ withdrawn from the slots of the plates $d$, so that the rear wheels are free to turn. However, as soon as the handle F is released, the rod E, in this case being free to be elevated by the spring $n$, thrusts the bolts $a$ outward and locks the hind wheels to the axle. By this means I prevent those accidents which frequently happen when, owing to the carelessness of the attendant, the carriage is allowed to run without guidance.

The rod E may be combined with a pulling-handle instead of a pushing-handle when the carriage is so constructed, the braking mechanism in this case being preferably carried by the front axle and being adapted to act upon the front wheels, and in some cases the rod E, located in respect to the propelling-handle as set forth, may be combined with braking apparatus other than that shown, the latter being preferred, however, on account of its direct and positive action, and because it demands a spring of much less tension than would be required by a friction-brake, so that the operation of the rod E does not necessitate any undue exertion, but is readily effected by the pressure of the hand in pushing or pulling the carriage.

The plates $d$ may be secured to the hub instead of being cast with the box $b$, if desired; but it is always preferable to adopt the latter construction, as it renders unnecessary the trouble and expense of attaching a separate plate to the hub. If desired, also, an elliptical spring or a block of rubber or like elastic material may be substituted for the coiled spring $n$.

I claim as my invention—

1. A positive brake in which the sliding locking-bolts on the axle are combined with plates $d$, rotating with the hub, and furnished with segmental slots $e$ for the entrance of the locking-bolts, as set forth.

2. The combination of the axle, the locking-bolts $a$, guided thereon, the rock-shafts $g$, with arms $f$ and $h$, the links $i$, and the operating-rod E, as set forth.

3. The combination of the propelling-handle of a child's carriage with braking mechanism and a brake-operating rod, located in respect to the propelling-handle as set forth, whereby when the handle is grasped the brake will be removed from the wheels, the operating-rod being freed and the brake applied when the propelling-handle is released, as set forth.

4. The hub-boxes $b$, having annular plates $d$, with segmental slots $e$ for the entrance of the locking-bolts, as set forth.

5. The combination of the axle, the bolts $a$, guided thereon, the rock-shafts $g$, with arms $f$ and $h$, the rod E, with collar $p$, the bearing $m$, spring $n$, and links $i$, as set forth.

In testimony whereof I have signed my name to this specification in the presence of two subscribing witnesses.

THOMAS J. FRANCIS.

Witnesses:
HARRY DRURY,
HARRY SMITH.